C. B. KLEFEKER.
EGG BOX.
APPLICATION FILED JULY 22, 1909.
957,218.
Patented May 10, 1910.
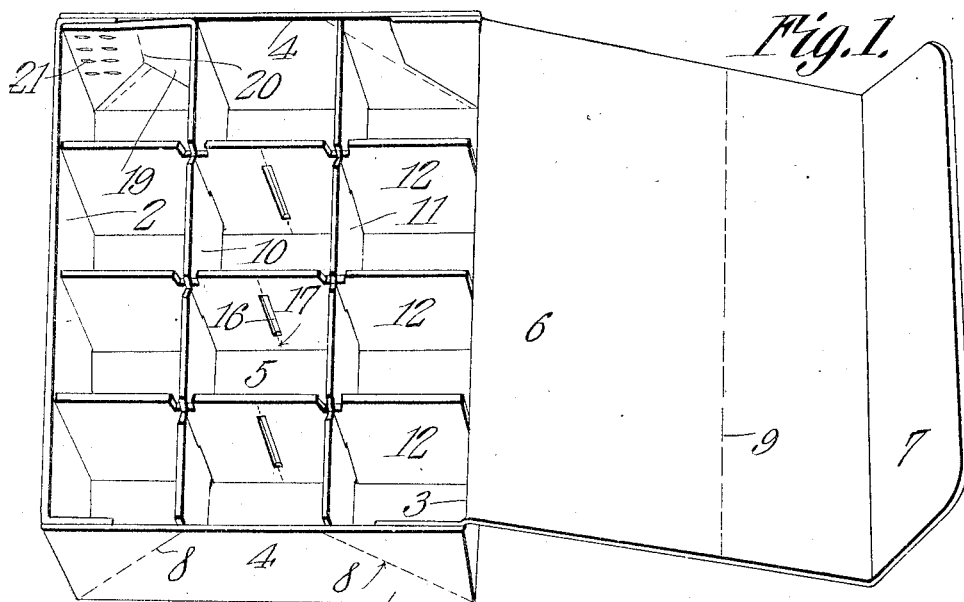
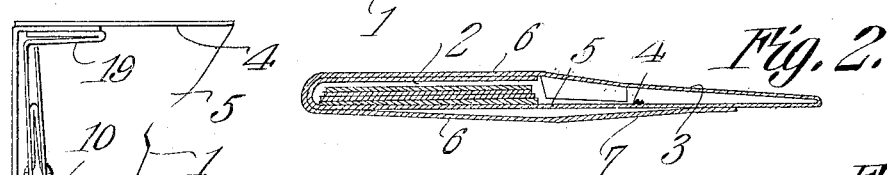
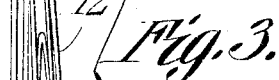
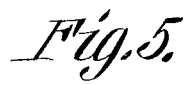
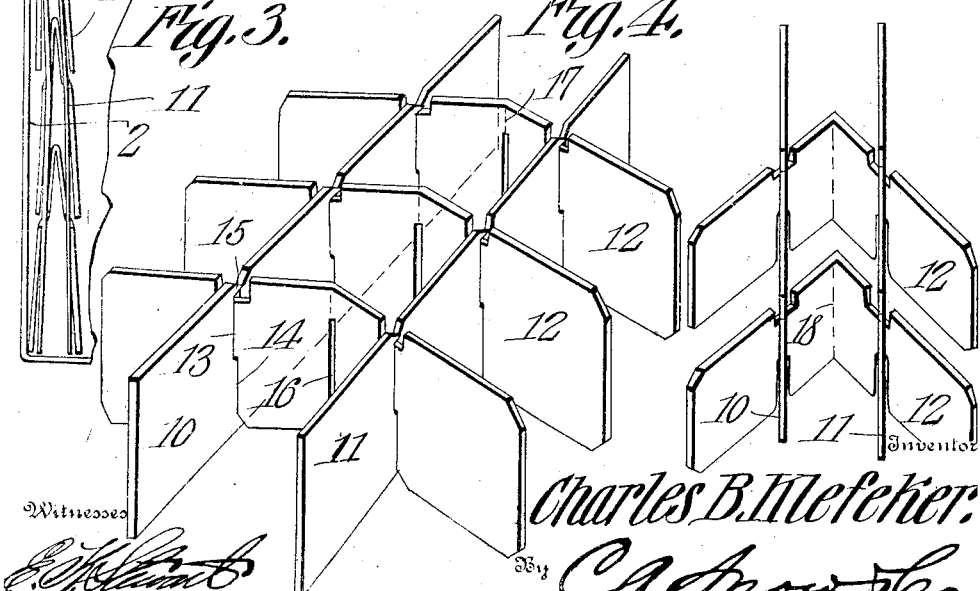
Witnesses
Inventor
Charles B. Klefeker.
By C. A. Snow & Co.
Attorneys

UNITED STATES PATENT OFFICE.

CHARLES B. KLEFEKER, OF NEWARK, NEW YORK, ASSIGNOR TO BLOOMER BROS. COMPANY, OF NEWARK, NEW YORK.

EGG-BOX.

957,218.

Specification of Letters Patent.

Patented May 10, 1910.

Application filed July 22, 1909. Serial No. 508,999.

*To all whom it may concern:*

Be it known that I, CHARLES B. KLEFEKER, a citizen of the United States, residing at Newark, in the county of Wayne and State of New York, have invented a new and useful Egg-Box, of which the following is a specification.

This invention has reference to improvements in egg boxes and is directed more particularly to the partition structure for dividing an egg box up into compartments each of which is of a suitable size to hold a single egg.

The invention is designed more particularly for a partition structure to be used in connection with egg boxes of a size to hold one dozen eggs, although the invention is applicable to egg boxes or crates of larger size.

The invention is particularly applicable to use in connection with folding egg boxes where the partition members are so secured to the body of the egg box as to become practically a permanent member of the egg box, the partition structure folding in such manner as to occupy a minimum of space when the body of the egg box is folded so as to occupy a minimum space during transportation, and especially on transportation to the point of egg supply after eggs have been removed from the egg box.

The invention will be best understood from a consideration of the following detail description taken in connection with the accompanying drawings forming a part of this specification in which drawings—

Figure 1 is a perspective view of an egg box adapted to contain one dozen eggs disposed in three rows of four each and showing the improved partition structure, the egg box being of the folding type. Fig. 2 is a section through the egg box in the folded condition. Fig. 3 is a view showing the manner of folding the partition against one of the longitudinal sides of the box. Fig. 4 is a perspective view of the partition members removed from the box or container and showing the cross members in a slightly folded condition, the means of connecting the partition members to the folding box body being omitted. Fig. 5 is a view of a modified form of the construction shown in Fig. 4.

Referring to the drawings, there is shown in Fig. 1 a box or container 1 provided with front and back members 2 and 3 respectively and end members 4. The box is also provided with a bottom 5 while the back longitudinal member 3 may be continued to form a cover 6 terminating in a flap 7 along that edge remote from the portion of the cover where it joins the rear member 3 of the box.

The end members 4 are foldable along lines indicated at 8 so that when these members are folded inwardly toward the bottom 5, the front member 2 and the rear member 3 will follow and the several members will fold down flat against the bottom 5 of the box. The cover 6 is also foldable along a longitudinal line indicated at 9 and may also be folded around the front edge of the box when the latter is collapsed so that the whole structure occupies a space of minimum thickness and of no greater extent than substantially that of the bottom 5.

The partition members comprise, in the structure shown in the drawings, two longitudinal partitions 10—11 and three cross or lateral partitions 12. Each longitudinal partition 10—11 is provided with an appropriate number of slots 13 extending from one edge of the respective partition to about the middle thereof and each cross partition 12 is provided with other appropriate slots 14 of like nature so that the longitudinal and cross partitions may be locked together in the usual manner. To prevent accidental lifting of the partitions 12 from the partitions 10—11, the open ends of the slots 13 may be each provided with a locking tongue 15 normally overriding the respective partitions 12.

In accordance with the present invention each partition 12 is foldable at a point about midway of its length. In the structure shown in Figs. 1 and 4 this is facilitated by forming a slot 16 partially across the partition 12 at about its middle point and then the partition will readily fold upon the lines indicated at 17. The slots 16 may be omitted and the material of the partition 12 may be continuous throughout the length of the fold as indicated at 18 in Fig. 5.

When the partition structure is to be made a substantially permanent part of a folding egg box then one of the longitudinal partitions, say the partition 10 is formed at one end with a continuation 19 capable of folding at its junction with the partition 10 and also at an intermediate point indicated at 20. The outer end of the extension 19 beyond the fold 20 is designed to be secured to the corresponding end 4 of the box near the point of junction of that end with either the front 2 or the back 3, the junction point of the end 4 with the front 2 being the point near which the outer end of the extension 19 is shown as secured to the end 4 in Figs. 1 and 3. The extension 19 constitutes a double hinge member and may be secured to the corresponding end 4 in any manner, as by staples 21.

The hinge member 19 is not a part of the present invention and is shown only to illustrate the adaptability of the present invention to an egg box where it is desirable that the partition members should be a substantially permanent portion of the said egg box.

Because of the central fold of the cross members 12 and the hinge movement of these members at the point of intersection with the longitudinal members 10 and 11, the said members 10 and 11 may be brought together without relative longitudinal displacement, the cross members readily folding up against the longitudinal members and so permitting the latter to be brought into close relation, being separated only by the folded up middle portion of the cross members.

The folded up partition members do not take a greater space longitudinally than when in the extended position, and this makes the type of partition structure shown in the drawings particularly adapted to use in connection with foldable egg boxes of the character shown in the drawings.

While the invention is more particularly intended for use in connection with egg boxes holding a dozen eggs each, it is also adapted to egg crates by increasing the number of longitudinal and cross partitions, with the cross partitions between two longitudinal partitions folding on a line parallel with the planes of the longitudinal partitions.

What is claimed is:

1. A folding partition structure comprising a plurality of longitudinal partitions in parallel relation and a plurality of cross partitions intersecting the longitudinal partitions and each movable on a longitudinal partition at the point of intersection about an axis at right angles to the length of the longitudinal partition, each cross partition being also foldable upon itself intermediate of adjacent longitudinal partitions and the entire structure folding without relative longitudinal movement of the longitudinal partitions.

2. A partition structure for egg boxes comprising longitudinal partitions in parallel relation, and transverse or cross partitions in pivotal connection with the longitudinal partitions and each foldable upon itself at an intermediate point between two adjacent longitudinal partitions.

3. A foldable partition structure for egg boxes comprising longitudinal partitions in parallel relation, and transverse or cross partitions in pivotal connection with and intersecting the longitudinal partitions, each cross partition being foldable upon itself at an intermediate point between two adjacent longitudinal partitions and there cut away for a portion of the length of the fold.

In testimony that I claim the foregoing as my own, I have hereto affixed my signature in the presence of two witnesses.

CHAS. B. KLEFEKER.

Witnesses:
 CARL K. VAN ETTEN,
 ERNEST F. FOX.